United States Patent [19]

Strzala

[11] 3,914,872
[45] Oct. 28, 1975

[54] DUAL PLUG GAUGER
[75] Inventor: Kazimer A. Strzala, Lafayette, Calif.
[73] Assignee: Owens-Illinois, Inc., Toledo, Ohio
[22] Filed: Oct. 10, 1974
[21] Appl. No.: 513,610

[52] U.S. Cl. ................ 33/178 R; 33/178 B; 209/82
[51] Int. Cl.[2] ........................ G01B 3/46; G01B 5/10
[58] Field of Search ........... 33/178 R, 178 B, 178 E; 73/37.8; 209/80, 82

[56] References Cited
UNITED STATES PATENTS

| | | | |
|---|---|---|---|
| 2,468,496 | 4/1949 | Ingle | 33/178 R |
| 2,596,342 | 5/1952 | McNutt et al. | 33/178 R |
| 3,100,570 | 8/1963 | White | 33/178 R |
| 3,464,547 | 9/1969 | Becker | 209/82 |
| 3,815,248 | 6/1974 | Kulig | 209/82 |

FOREIGN PATENTS OR APPLICATIONS

| | | | |
|---|---|---|---|
| 1,489,220 | 6/1967 | France | 33/178 R |

*Primary Examiner*—Richard E. Aegerter
*Assistant Examiner*—Richard H. Stearns
*Attorney, Agent, or Firm*—Steve M. McLary; Edward J. Holler

[57] ABSTRACT

A plug gauger for the finish portion of containers which will gauge two separate diameters of the finish. A minimum diameter plug gauge carried by a main shaft is inserted into a finish of a container to ensure that the finish exceeds a pre-selected minimum value. The main shaft has a central longitudinal passage and transverse passages at the bottom of the longitudinal passage. A source of a gas under pressure is connected to the longitudinal passage. A corkage plug gauge is located below the transverse passages and above the minimum diameter plug gauge. A spring biases the corkage plug gauge downward toward the minimum diameter plug gauge. When the corkage plug gauge is usable to pass a diameter, whose dimension must be controlled, within the finish, the corkage plug gauge covers the transverse passages as the main shaft slides over the stationary corkage plug gauge. This causes generation of a back pressure which can be monitored to determine the condition of the diameter measured by the corkage plug gauge.

5 Claims, 2 Drawing Figures

DUAL PLUG GAUGER

BACKGROUND OF THE INVENTION

This invention generally relates to plug gauging of container finish diameters. More particularly, this invention relates to an improved gauging head for plug gauges which will measure two separate diameters of the finish independently of one another during a single pass of the gauging head. Specifically, this invention relates to a plug gauging head which can gauge a corkage diameter a fixed distance within a container finish as well as the diameter of the opening of the container finish.

The plug gauging of the opening of the finish portion of a container to ensure that the opening is of at least a selected minimum diameter is known in the art. However, wine bottles which are sealed with a cork have a second diameter in the finish opening which must also be maintained to ensure proper sealing of the cork. This dimension is known as the corkage diameter and is typically located about one-half inch into the finish. This dimension is not necessarily the same as the minimum opening diameter. Thus, a plug gauge for the opening would not necessarily gauge the corkage diameter properly. I have invented a plug gauging head which will first gauge the minimum opening diameter and then, using a different plug gauge carried on a common shaft with the minimum diameter plug gauge, will also gauge the corkage diameter during the same stroke of the gauging head. The best example of the prior art now known to me may be seen in U.S. Pat. No. 3,771,650.

SUMMARY OF THE INVENTION

My invention is an improved gauging head for an apparatus for the plug gauging of the finish portion of a container. In apparatus of this general type, a minimum diameter plug gauge is inserted into the finish of the container and a signal is generated if the plug gauge fails to enter the container. The improved gauging head includes a carrier head. The carrier head has a longitudinal passage formed in it and a recess portion, connected to the longitudinal passage, which is positioned adjacent to the finish. A source of gas under pressure is connected to the longitudinal passage. A main shaft is engaged in the longitudinal passage in the carrier head. The main shaft includes a longitudinal passage which extends through a part of its length and which is connected to the longitudinal passage in the carrier head. At least one transverse passage near the base of the longitudinal passage in the main shaft connects the longitudinal passage in the main shaft with the exterior surface of the main shaft. The minimum diameter plug gauge is carried by the end of the main shaft. An annular corkage plug gauge is slideably mounted on the main shaft in a location below the transverse passage. A tubular spacer sleeve is mounted on the main shaft between the corkage plug gauge and the minimum diameter plug gauge to maintain a fixed minimum spacing therebetween. A spring extends between the upper portion of the recess and the corkage plug gauge to bias the corkage plug gauge normally toward the minimum diameter plug gauge. A means is provided for sensing when the corkage plug gauge has been moved against the spring bias to a position blocking the transverse opening in the main shaft.

DETAILED DESCRIPTION OF THE DRAWINGS

Figures 1, 2:
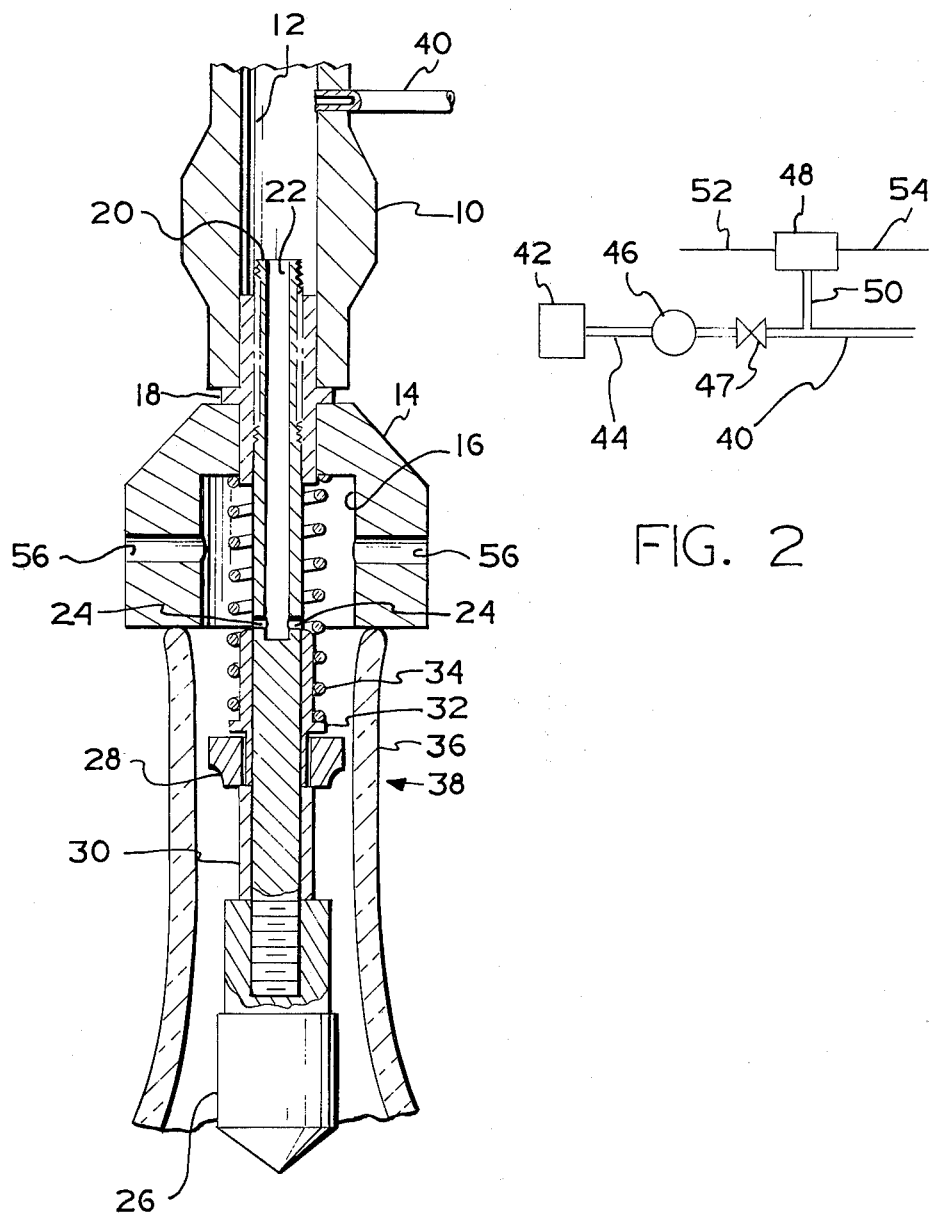
FIG. 1 is a side elevational view, partially in cross-section, of the gauging head of the present invention inserted in the finish of a container.
FIG. 2 is a schematic diagram of the sensing system of the present invention.

The present invention is primarily concerned with an improved plug gauging head. The specific technique by which this head is used to gauge the interior of the finish portion of a container is not of primary importance. The head of the present invention could be used as a hand-held unit for an off-line quality control analysis, or could be used as an automatic inline-type of inspection device. One example of a plug gauging machine on which the inspection head of the present invention could be used may be seen in U.S. Pat. No. 2,596,342, the teachings of which are hereby incorporated by reference. In the device of the cited patent, plug gauging heads are brought into engagement with a single file, spaced-apart plurality of containers as they are moved along a conveyor. The plug gauging heads themselves move with the containers and perform the gauging function while in motion. Another type of device with which the plug gauging head of the present invention may be used can be seen in U.S. Pat. No. 3,313,409, the teachings of which are hereby incorporated by reference. The machine of this patent is a rotary-type indexing inspection machine for glass containers at which plug gauging is an inspection function performed at one of a plurality of inspection stations.

In FIG. 1, a coupling member 10 may be used to connect the total gauging head of the present invention to the drive mechanism of an automatic plug gauging machine. Of course, if the plug gauging head of the present invention is used in an off-line, hand-held mode, the coupling member 10 would usually be grasped in the hand of an operator of the device. The coupling member 10 includes a central bore or passage 12 which extends longitudinally completely through it. Below the coupling member 10 is a cup member 14 which includes a recess portion 16. The coupling member 10 and the cup member 14 are held together as a unit through a connecting sleeve 18. The cup member 14 also has a central longitudinal passage that communicates with the recess portion 16 and the cup member 14, and the connecting sleeve 18 fits into this central passage and also into the central bore 12 of the coupling member 10. It should be evident that the coupling member 10, the cup member 14 and the connecting sleeve 18 could all be made as a single part rather than in three distinct parts as shown in FIG. 1. The single part could then be considered to be a carrier head which would have a longitudinally extending passage and a recess portion formed therein. The connecting sleeve 18 is a tubular member which also has a central passage that is not visible in FIG. 1, because a main shaft 20 is threadably engaged in the passage through the connecting sleeve 18. The main shaft 20 has a longitudinal passage 22 that extends partially through its length. At the lower terminus of the passage 22, at least one transverse passage 24, two of which are actually shown in FIG. 1, connects the longitudinal passage 22 with the outside surface of the main shaft 20. The lower end of the main shaft 20 carries a minimum diameter plug gauge 26 which is threadably engaged thereon. An annular corkage plug gauge 28, whose function will be explained later, is slideably mounted on the main shaft 20 below the position of the transverse passage 24. A tubular spacer sleeve 30 is mounted on the main shaft 20 between the corkage plug gauge 28 and the minimum diameter plug gauge 26 in order to maintain a fixed minimum spacing between these two gauges. Above the corkage plug gauge 28 but still below the transverse passage 24, is a flanged sleeve 32 which is also slideably mounted on the main shaft 20. A coil spring 34 surrounds the main shaft 20 and extends between the upper portion of the recess 16 in the cup member 14 to the flange on the flanged sleeve 32. The spring 34 exerts a biasing force on the flanged sleeve 32 to normally bias the flanged sleeve 32 toward the minimum diameter plug gauge 26. Note that the flanged sleeve 32 has a portion that extends downward to the top of the tubular spacer sleeve 30. The corkage plug gauge 28 actually is placed over this portion of the sleeve 32. The corkage plug gauge 28 is therefore floating with respect to the sleeve 32. This is a useful configuration because the corkage diameter and the finish opening diameter are not necessarily concentric. In case the corkage plug gauge 28 strikes a part of the finish during its entry into a container, the fact that it floats with respect to the sleeve 32 will prevent a false signal. In such a case, the corkage plug gauge 28 can center itself without significant movement of the sleeve 32. In some cases, when the two diameters are required to be concentric, the sleeve 32 can be eliminated and the corkage plug gauge 28 itself can be directly biased by the spring 34.

The configuration shown in FIG. 1 is that which occurs after the entire assembly has been inserted into the finish portion 36 of a container 38. As is known, the finish portion 36 of any container 38 is the uppermost portion of the container which has an opening to allow filling of the container and emptying of the contents thereof. Typically, the diameter of the opening of the finish portion 26 is one of the critical dimensions of the container, particularly glass containers, and in the past minimum diameter plug gauges such as that designated as 26 have been used to ensure that the opening of the finish 36 meets these minimum standards. However, it is also necessary in the case of some specific containers, particularly glass containers used for wine or champagne which are sealed by inserting a cork, that a dimension further into the finish portion 36 also meet certain standards. An example of such a standard would be that the diameter of the inside of the finish 36 be at least 0.723 inches in diameter at a depth of 3/16ths of an inch into the finish portion 36. Dependent upon the needs of a particular container, this dimension can be specified in one of two different ways, and the gauging head of the present invention can be used in either mode to measure this dimension. First of all note that the minimum diameter plug gauge 26 is the first dimensional check that is made, since typically these gauging heads are lowered into the finish portion 36 of the container 38. Thus the minimum diameter of the opening of the finish portion 36 is checked by the minimum diameter plug gauge 26. Then, as the main shaft 20 continues to descend, the corkage plug gauge 28 is brought into play. The diameter further into the finish portion 36 is known as the corkage diameter thus giving the corkage plug gauge 28 its name. Under some circumstances, the corkage diameter must exceed a specified minimum diameter at the prescribed depth. In this case, the corkage plug gauge 28 is sized such that it will pass through the corkage diameter so long as this opening exceeds the specified minimum value. However, when this minimum value is not maintained, the corkage plug gauge 28 will be stopped in its downward motion. This will then cause the corkage plug gauge 28 to force the flanged sleeve 32 to rise against the bias of the coil spring 34 thus covering the transverse passages 24 in the main shaft 20. The main shaft 20 is normally pressurized with a gas under pressure, preferably compressed air, which is furnished to the central bore 12 of the coupling member 10 through an inlet pipe 40. Since the longitudinal passage 22 in the main shaft 20 is in communication with the central bore 12 this passageway 22 is likewise pressurized. Closing the transverse passage 24 creates a back pressure which is transmitted back along the inlet pipe 40 as a signal indicating that the minimum diameter in the corkage area has not been maintained. On the other hand, it is sometimes necessary to ensure that the corkage diameter does not exceed a specified maximum diameter at a particular depth. In this case, the corkage plug gauge 28 is sized such that it will be stopped in its downward motion so long as this maximum diameter is not exceeded. This will then again cause blockage of the transverse passage 24 by the movement of the flanged sleeve 32 and cause generation of a signal every time the maximum diameter is not exceeded. However, should the maximum diameter be exceeded, the corkage plug gauge 28 may pass through the area without causing the flanged sleeve 32 to rise, thus leading to the failure of generation of the signal.

FIG. 2 illustrates how these signals may be used. A source of gas under pressure 42 is connected through a pipe 44 to a pressure regulator 46. The pressure regulator 46 is used to hold the pressure of the gas used at a level that is suitable for a pressure-sensitive switch 48. This level typically is in the range of four pounds per square inch pressure. The outlet of the pressure regulator 46 is connected to the pipe 40 which furnishes pressurized gas to the coupling member 10 as previously described. A cross-connecting pipe 50 transmits the pressure in the pipeline 40 to the pressure-sensitive switch 48. Also connected in the pipe 40, before the pressure-sensitive switch 48, is a needle valve 47. The needle valve 47 is used to reduce the total volume of gas available. A fixed orifice in this location would serve the same function. The transverse passages 24 do not allow enough gas to bleed off or escape to prevent premature actuation of the pressure-sensitive switch 48. Such switches normally operate on very small pressure differentials and a large flow rate which could not be exhausted completely would cause generation of a false pressure signal. Under normal circumstances, so long as the gas furnished to the main shaft 20 may exit through the transverse passages 24, there will be no generation of back pressure in the pipe 40 and consequently no pressure generated in the cross-connecting pipe 50. However, blockage of the transverse passages 24 will cause generation of a back pressure signal which is transmitted through the pipe 50 into the switch 48 which will cause actuation of the switch 48. The switch 48 has an inlet electrical line 52 and an outlet or signal electrical line 54.

Considering first the case where the corkage diameter must exceed a specified minimum diameter at a specified depth, the pressure-sensitive switch 48 would be wired to be normally open. That is, so long as no signal is present in the cross-connecting pipe 50 no signal will be present on the outlet line 54 of the switch 48. So long as the minimum diameter is exceeded, the corkage plug gauge 28 will smoothly enter the finish portion 36 of the container 38 and will not cause blockage of the transverse passages 24 thus leading to generation of a pressure pulse. However, when the corkage plug gauge 28 is stopped by an obstruction in the finish portion 36, thereby indicating the failure to exceed the specific minimum diameter, a pressure pulse will be generated, the switch 48 will be turned on and an electrical signal will be presented along the outlet line 54, thereby indicating the failure of that specific container 38 to meet the quality standards. In the other case mentioned, the pressure-sensitive switch 48 would be wired in a normally closed configuration. This means that an electrical signal is constantly present on the outlet line 54 unless a pressure pulse is generated in the cross-connecting pipe 50. Under these circumstances, it is necessary that the corkage plug gauge 28 be stopped in its downward motion on each gauging pass to turn off the pressure-sensitive switch 48 and thereby halt propagation of any signal along the outlet line 54. This does occur because, as was previously noted, this is the circumstance in which the diameter at the corkage area must not exceed a specified maximum value. Therefore, each time the gauging assembly is inserted into the finish portion 36, the corkage plug gauge 28 will be stopped so long as the maximum diameter is not exceeded. The flanged sleeve 32 will cover the transverse passages 24, thereby causing generation of a back pressure in the cross-connecting pipe 50 and causing the pressure-sensitive switch 48 to be turned off, or to be switched from its normally closed to an open configuration. This causes cessation of the signal along the electrical outlet line 54. It is quite obvious to those skilled in the art that the various signals that can be presented by the electrical outlet line 54 can be used to operate a memory system, a reject system, a warning light or other devices, such as solenoid devices, which can give indication of the presence of a defective container 38 or can cause immediate actuation of a rejection unit.

Note that in all cases the recess portion 16 formed in the cup member 14 allows the corkage plug gauge 28 and flanged sleeve 32 to move upward freely and into an unrestrained area so that the entire gauging head may make a complete stroke without interference regardless of whether or not the corkage plug gauge 28 is able to make a complete stroke. In some cases, as shown in FIG. 1, the cup member 14 will come down completely upon the portion of the finish 32. In this case, the air exhausting from the transverse passages 24 could create an undesirable pressurization effect within the container 38, perhaps leading to confusion in the generation of a signal. To avoid this particular problem, transverse passages generally designated as 56 are formed in the cup member 14 communicating with the recess portion 16 and with the outside surface of the cup member 14. This allows free exhaust of the gas from the transverse passages 24 through the recess portion 16 and thence to the outside atmosphere. Also note that the interior of the connecting sleeve 18 and the exterior of the upper portion of the main shaft 20 are complementarily threaded. If it is necessary to adjust the precise distance within the container which is gauged for the corkage diameter, as will commonly be the case when using this device for more than one container, the relative position of the corkage plug gauge 28 with respect to the connecting sleeve 18 may be adjusted by rotating the main shaft 20. This will then cause the corkage plug gauge 28 to be extended further into the finish portion 36 at the end of a complete stroke or pulled back so that it will not extend as far into the finish portion 36.

It should, therefore, be clear that the gauging head of the present invention will perform two separate gauging functions. First of all, the minimum diameter plug gauge 26 will perform the conventional and well known function of gauging the opening of the finish portion 36 to ensure that it exceeds a selected minimum diameter. The pressure-sensitive switch 48 will serve as a means for sensing when the corkage plug gauge 28 has been moved against the spring bias of the spring 34 to a position which blocks the transverse passages 24 in the main shaft 20. This then will give an indication of the condition of the corkage diameter at a position in the interior of the finish portion 36. This will then allow complete gauging of a finish 36 particularly designed to accept a cork. Whether the corkage plug gauge 28 generates a back pressure signal for a good container or generates such a signal for a bad container is immaterial, since the wiring of the pressure-sensitive switch 48 is readily changed and the output signal on the outlet line 54 is easily determined for each particular condition and may be utilized as circumstances dictate.

I claim:

1. In an apparatus for plug gauging the interior of the finish portion of a container, wherein a minimum diameter plug gauge is inserted into the finish of said container and a signal is generated if said plug gauge fails to enter said container, the improvement in said apparatus which comprises:

a carrier head, said carrier head including a longitudinally extending passage and a recess portion adjacent to said finish and communicating with said longitudinal passage;

a source of gas under pressure connected to said longitudinal passage;

a main shaft, having a longitudinal passage extending partially therethrough and communicating with said longitudinal passage in said carrier head, engaged in said longitudinal passage in said carrier head, said main shaft including at least one transverse passage communicating with the exterior surface of said main shaft and said longitudinal passage therein, said minimum diameter plug gauge being attached to the end of said main shaft;

an annular corkage plug gauge slideably mounted on said main shaft in a location below said transverse passage;

a tubular spacer sleeve mounted on said main shaft between said minimum diameter plug gauge and said corkage plug gauge to thereby maintain a fixed minimum spacing therebetween;

a spring extending between the upper portion of said recess portion and said corkage plug gauge for biasing said corkage plug gauge normally toward said minimum diameter plug gauge; and means for sensing when said corkage plug gauge has been moved against said spring bias to a position blocking said transverse passage in said main shaft.

2. The improvement of claim 1 wherein said means for sensing when said corkage plug gauge has been moved comprises:
 a pressure-sensitive switch, connected to said longitudinal passage in said carrier head, said pressure-sensitive switch being responsive to the back pressure signal generated by blocking said transverse passage.

3. The improvement of claim 1 wherein said carrier head further includes at least one transverse passage communicating with the outer surface of said carrier head and with said recess portion.

4. The improvement of claim 1 wherein said carrier head further includes a threaded portion in said longitudinally extending passage; and
 wherein said main shaft is complementarily threaded on the exterior surface thereof to engage with said threads in said carrier head.

5. The improvement of claim 1 which further includes:
 an annular flanged sleeve, slideably mounted on said main shaft in a location below said transverse passage, said spring extending between a flange on said flanged sleeve and the upper portion of said recess portion and said corkage plug gauge being slideably and loosely mounted on said flanged sleeve below said flange.

* * * * *